(12) United States Patent
Macdonald et al.

(10) Patent No.: US 10,104,992 B2
(45) Date of Patent: Oct. 23, 2018

(54) TEA MAKER

(75) Inventors: Graeme Macdonald, Vaucluse (AU); Richard Hoare, Lane Cove (AU)

(73) Assignee: BREVILLE PTY LIMITED, Alexandria, New South Wales (AU)

( * ) Notice: Subject to any disclaimer, the term of this patent is extended or adjusted under 35 U.S.C. 154(b) by 201 days.

(21) Appl. No.: 13/561,079

(22) Filed: Jul. 30, 2012

(65) Prior Publication Data

US 2012/0318148 A1 Dec. 20, 2012

Related U.S. Application Data

(63) Continuation of application No. 12/446,752, filed as application No. PCT/AU2007/001621 on Oct. 24, 2007, now abandoned.

(30) Foreign Application Priority Data

Oct. 24, 2006 (AU) .............................. 2006905896

(51) Int. Cl.
| | |
|---|---|
| *A47J 31/44* | (2006.01) |
| *A47G 19/16* | (2006.01) |
| *A47J 31/20* | (2006.01) |

(52) U.S. Cl.
CPC .............. *A47G 19/16* (2013.01); *A47J 31/20* (2013.01)

(58) Field of Classification Search
CPC ........ A47J 31/0615; A47J 31/20; A47J 31/44; A47J 31/047; A47J 31/00; A47J 31/06; A47G 19/16
USPC ......... 99/282, 281, 279, 280, 283, 285, 287, 99/289 R, 302 R, 317, 318, 319, 323, 99/299, 321
See application file for complete search history.

(56) References Cited

U.S. PATENT DOCUMENTS

| | | |
|---|---|---|
| 450,208 A | 4/1891 | Williams |
| 793,655 A | 7/1905 | Haley |
| 1,123,467 A | 1/1915 | Bauer |
| 1,211,614 A | 1/1917 | Morales |
| 1,579,636 A | 4/1926 | Borgnis |
| 1,665,199 A | 4/1928 | Bachelder |
| 1,870,254 A | 8/1932 | Kircher et al. |

(Continued)

FOREIGN PATENT DOCUMENTS

| | | |
|---|---|---|
| CH | 682798 A5 | 11/1993 |
| DE | 2843483 A1 | 4/1980 |

(Continued)

OTHER PUBLICATIONS

International Search Report and Written Opinion for PCT/AU2007/001621, dated Nov. 23, 2007.

*Primary Examiner* — Tu B Hoang
*Assistant Examiner* — Diallo I Duniver
(74) *Attorney, Agent, or Firm* — Marshall, Gerstein & Borun LLP

(57) ABSTRACT

A tea maker comprises a vessel in which is located a conveyor. The conveyor, preferably vertically, transports a carriage. The conveyor and a carriage are surrounded by a tube and are protected from the water in the vessel. An enclosed basket is coupled to the carriage. An external user interface allows a user to select brewing parameters such as the type of beverage brewed, the brewing temperature, and the steeping time. The selection is sent to a processor. The processor then encodes the selection into a control data for the heating assembly or the conveyor.

21 Claims, 16 Drawing Sheets

(56) References Cited

U.S. PATENT DOCUMENTS

| | | | |
|---|---|---|---|
| 1,884,070 A | 10/1932 | Max Mennicke | |
| 2,099,996 A | 11/1937 | Beling | |
| 2,109,363 A | 2/1938 | Erastus Williams | |
| 2,560,214 A | 7/1951 | Cameron | |
| 2,562,433 A | 7/1951 | Moore | |
| 2,566,914 A | 9/1951 | Worst | |
| 3,665,841 A * | 5/1972 | Hardy et al. | 99/281 |
| 4,401,014 A | 8/1983 | McGrail et al. | |
| 5,027,696 A * | 7/1991 | Antonini | 99/279 |
| 6,135,010 A | 10/2000 | Husted et al. | |
| 6,571,934 B1 * | 6/2003 | Thompson | B65G 23/18 198/619 |
| 7,779,751 B2 | 8/2010 | Gilbert | |
| 2007/0028781 A1 * | 2/2007 | Popeil et al. | 99/407 |
| 2007/0278202 A1 | 12/2007 | Long et al. | |
| 2008/0274246 A1 * | 11/2008 | Glucksman et al. | 426/425 |

FOREIGN PATENT DOCUMENTS

| | | |
|---|---|---|
| DE | 3636999 A1 | 5/1988 |
| DE | 29802338 U1 | 6/1999 |
| DE | 10308740 A1 | 9/2004 |

* cited by examiner

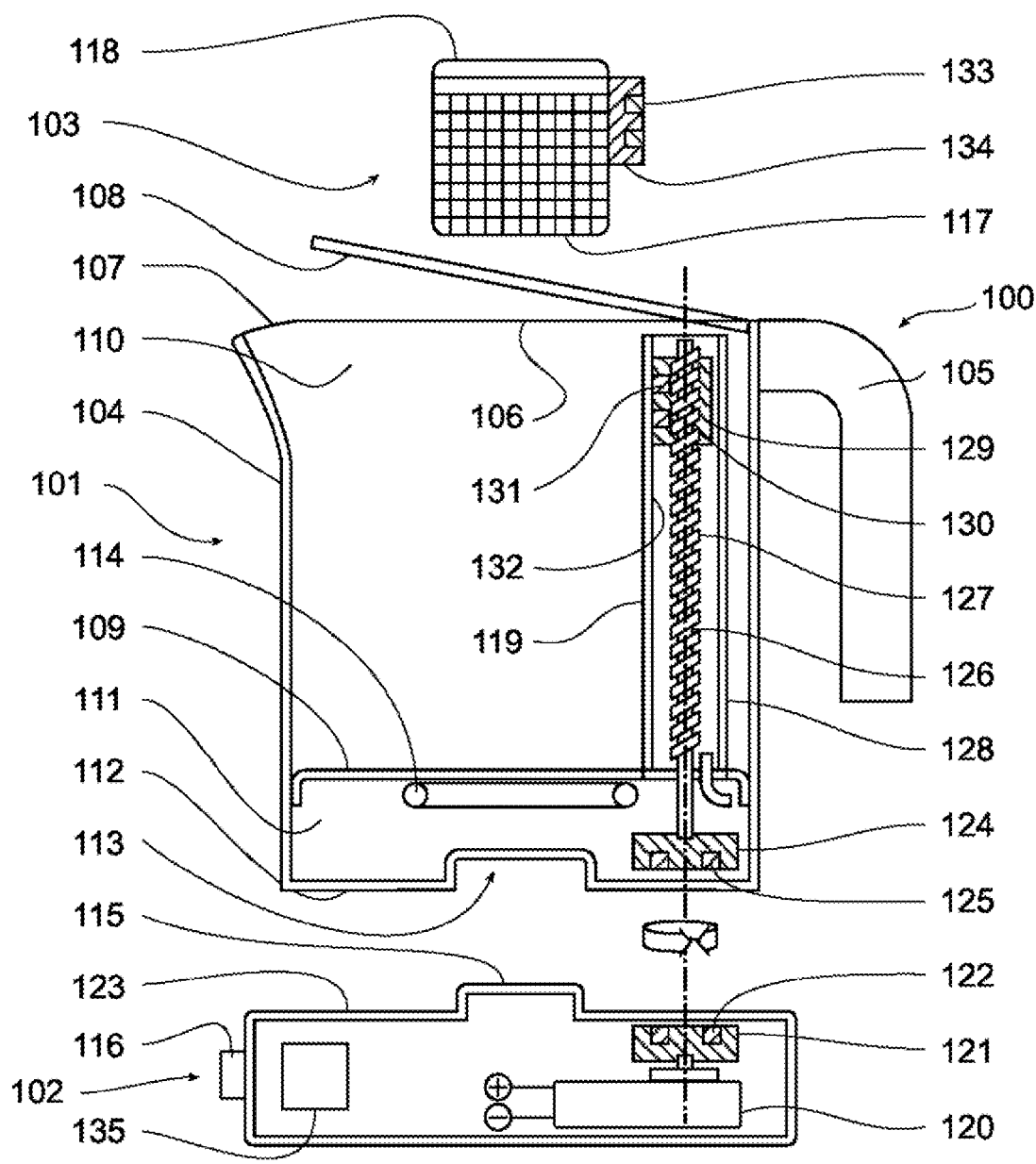
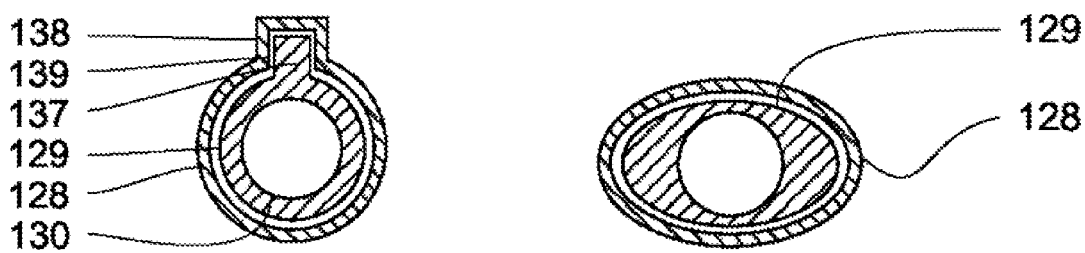
FIG. 1A
FIG. 1B  FIG. 1C

TEA MAKER

FIELD OF THE INVENTION

This invention pertains to kitchen appliances, more particularly, to device for brewing tea.

BACKGROUND OF THE INVENTION

Tea brewing, usually involves a vessel for boiling or heating water and a separate vessel in which the tea is brewed. Tea brewed at the wrong temperature or for the wrong steeping time will adversely affect the flavour. There are no known automatic or domestic tea brewing machines that can, in the same vessel, heat the water to a range of different temperatures, automatically introduce the tea at the correct time or temperature, steep for a set period of time and then automatically remove the tea leaves from the water.

OBJECTS AND SUMMARY OF THE INVENTION

It is an object of this invention to provide an electric appliance which can be used to heat water and brew tea for a user determined steeping time in the same vessel.

It is another object of the invention to facilitate users in brewing different types of tea, to their preference.

Accordingly, there is provided a tea maker comprising a vessel, a vertical conveyor located in the vessel and a basket that is located in the vessel and carried by the conveyor.

There is also provided a tea maker comprising a vessel that further comprises a transparent compartment and a metal compartment. The vessel also comprises a basket located within the vessel, the basket having a range of vertical positions.

BRIEF DESCRIPTION OF THE DRAWING FIGURES

In order that the invention be better understood, reference is now made to the following drawing figures in which:

FIG. 1 (*a*) is an exploded cross sectional view of a tea maker;

FIG. 1 (*b*) is a cross section of the tube and the carriage;

FIG. 1 (*c*) is a cross section of another embodiment of the tube and the carriage;

BEST MODE AND OTHER EMBODIMENTS

Figure 2:
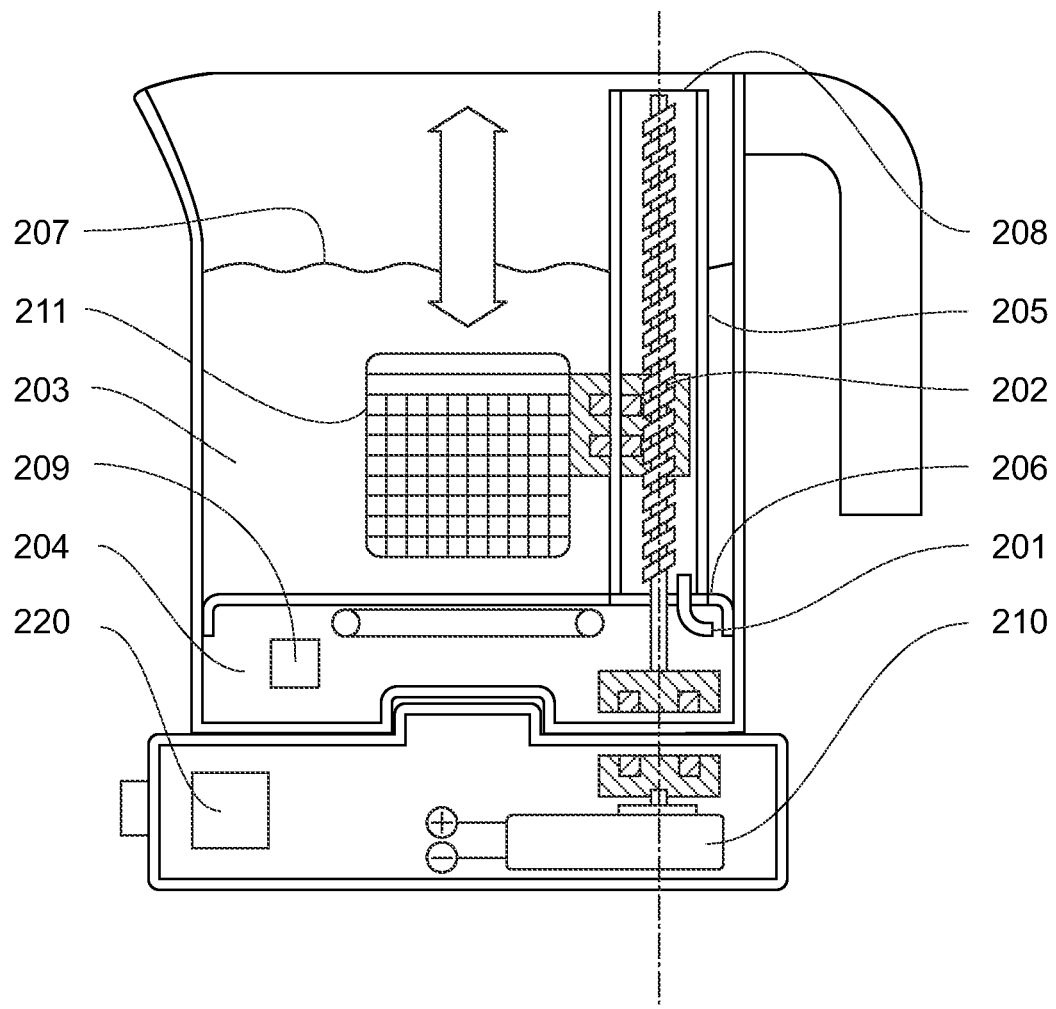
FIG. 2 is a cross sectional view of the tea maker when the basket is in a low position.

Referring to FIG. 1, a first embodiment of the tea maker 100 comprises a lidded vessel 101 that is detachable from a power base 102. To brew tea, a lidded and porous (e.g. meshed) basket or enclosure 103 containing tea leaves is placed onto a conveyor in the vessel 101. The height of the vessel is sufficient to accommodate the height of the basket above the maximum liquid level, even with the lid closed.
The Vessel and the Power Base The vessel 101 includes a main body 104 and a handle 105. The main body 104 has a top opening 106 forming a spout 107 opposite the handle 105. The opening 106 is coverable by a hinged or removable lid 108. The interior of the main body 104 is divided by a watertight partition 109 into a liquid compartment 110 and a lower compartment 111. The liquid compartment no extends from the opening 106 to the partition 109, and may be made of glass or another transparent material, whereas the lower compartment 111 extends from the partition 109 to the bottom of the vessel 112. The lower compartment 111 contains the heating element and the mechanical or electronic controls.

A central recess 113 is located on the underside of the body, and allows the vessel 101 to make electrical contact with, and rest on the power base 102. A five pole contact system permits pourer and data or control signals to be transmitted between the base of the vessel. A heating assembly (i.e. the heating element and its controls) and the required temperature or steam sensing assembly 114 may be placed in the lower compartment in. The power base has a raised hub 115 with appropriate electrical contacts that are received by the central recess 113. There are external user controls 116 on the exterior of the power base. These controls are connected to the processor 135 in the base. The controls 116 can be used to delay or time the inception of the brew process, switch on the unit, and to input brew temperature, brew time or tea type. The processor 135 can, for example, automatically select an appropriate brew time from its memory based on the user's input of a tea type. The processor 135 governs factors such as brewing temperature, brewing time, basket position, and other relevant parameters in tea making. The external user controls 116 may be one or more mechanical or electronic features, such as knobs, dials, or key-pads, for the user to input variables such as tea type, strength, water temperature, and brew time. User operated controls may be mounted on the power base or on the kettle vessel as will be explained. Electrical communication between the vessel and the power base occurs through cooperating electrical contacts located on the raised hub 115 and within the recess 113 as is known in the art. Where mechanical on-off switching is used, a mechanically linked, user operated mechanical button may be present on the power base (see FIG. 3) or, for example, on the vessel's handle (see FIG. 8) or elsewhere on the vessel.

In one alternate embodiment, a current sensor 220 (suggested in FIG. 2) in the power base detects when there has been a current flow to the heating element in the kettle and senses when that flow has ceased. The sensor 220 supplies its output to the processor 135. When the electrical current flow has ceased (because the water is hot enough), the processor 135 activates the motor to lower the tea basket into the water via the vertical conveyor. After the specified brewing time, the mechanism then lifts the tea from the water. A sound may be then be generated by or initiated by the processor to notify the user that the tea making process in complete.

The Basket

Figure 10:
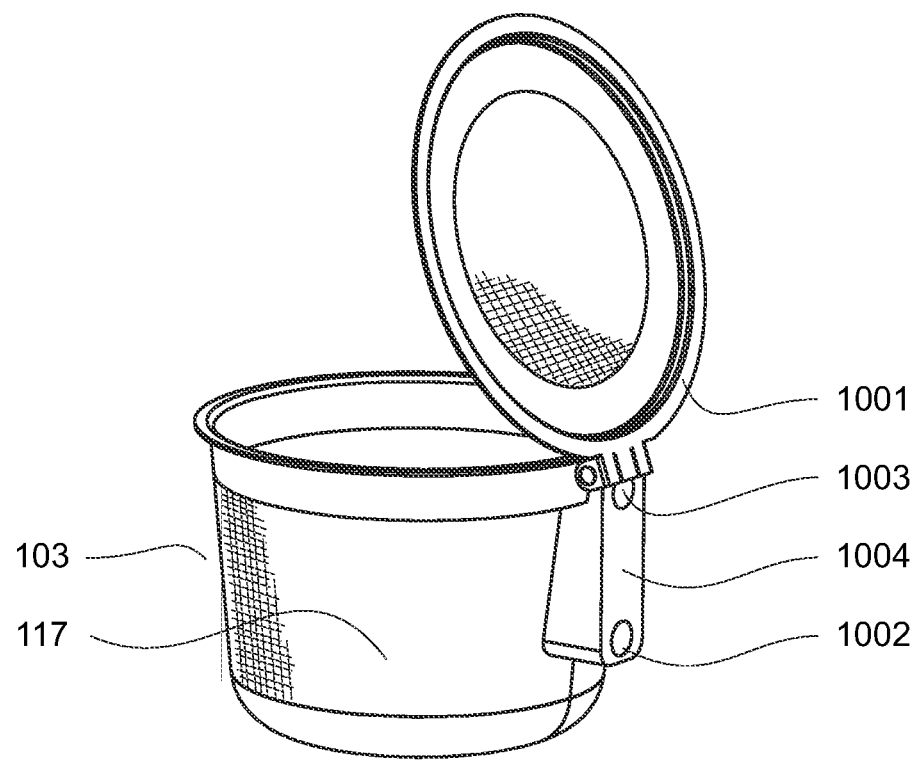
FIG. 10 is a perspective view of a tea basket.

The basket 103 comprises a porous or liquid permeable, for example meshed body 117 that is closed by a top lid 118. The mesh is fine enough to contain tea leaves during brewing. The mesh may be an expanded mesh. Preferably the entire basket is stainless steel. Tea bags may also be added to the basket. A bracket 134 attached to the meshed body 117 carries a first set of lift magnets 133. Note, as seen in FIG. 10, that the magnets 1002, 1003 are vertically aligned and brought into the same vertical plane by a boss 1004. As will be explained later, the magnets 133 cooperate with a vertical conveyor system 119 that retains and transports the basket up and down within the liquid compartment. The bracket may also (or solely) include a means of mechanically coupling to the vertical conveyor.

As seen in FIG. 10, the basket 103 may have a spring biased lid 1001. The lid is biased into a closed position so that tea leaves do not escape the basket during brewing. The lid may be rim sealed with respect to the basket. A boss 1004 carries the magnets 1002 and 1003. The spring for the lid may be concealed within the boss 1004.

The Vertical Conveyor System

The vertical conveyor system 119 is preferably located at an off-centre location permitting the basket to be approximately at the centre of the vessel.

In the example of FIG. 1., the vertical conveyor system 119 comprises a motor 120 in the power base. The motor drives a lower rotating disk 121. The disk 121 carries a first set of base magnets 122 just beneath and concealed by the top surface 123 of the power base. An upper rotating disk 124 is located in the lower compartment in. The second set of base magnets is located just above and concealed by the bottom of the vessel. The upper rotating disk 124 contains a second set of base magnets 125. The upper and lower rotating disks are magnetically coupled together when vertically aligned and in proximity.

A vertical shaft 126 with helical threads 127 acts as a conveyor and is rigidly attached to the upper rotating disk 124. The shaft 126 extends from the upper rotating disk in the lower compartment, through the partition, and into the area of liquid compartment, spanning most of the height of the liquid compartment. In order that liquid does not interfere with the operation of the vertical conveyor system 119, a tube 128 surrounds the shaft 126.

In some embodiments, the shaft 126 transports a carriage 129 with cooperating internal threads 130. The basket 103 is magnetically attachable to this carriage and can be moved to a range of vertical positions. To achieve this coupling, the carriage has a first set of lift magnets 131. The first and second sets of lift magnets 133, 131 are coupled together when the basket and the carriage are attached.

For the basket to move vertically as the screw turns, the carriage must not rotate with the screw. As shown in FIG. 1(b), a portion of the tube carriage 129 forms a key 137 that is received by a keyway 138 in the interior of the tube. The carriage is prevented for rotating in relation to the tube 128, because the rotation of the key 137 is blocked by the sides 139 of the keyway 138. In another example shown in FIG. 1(c), the tube and the carriage may be shaped, for instance as an oval, such that relative rotation between one another is prevented. Note that to improve the steeping of tea and particularly tea bags, the basket may be made to move up and down in quick brew enhancing strokes ("reciprocating strokes") to aid the circulation of liquid though the leaves. The strokes may be, for example, half or less of the total travel distance of the basket or carriage on the conveyor. The amplitudes of the strokes are therefore less than the total range of motion of the conveyor.

In one preferred embodiment, the carriage is provided with the aforementioned magnets and is transported by the conveyor inside the tube. The basket also carries magnets that couples with the carriage's magnets. The magnets couple through a preferably stainless steel tube. This coupling allows the basket to be transported along with the carriage without any additional linkage that extends from the inside to the outside of the tube. Therefore, the tube can have a closed, preferably stainless steel top 208.

Figure 13:
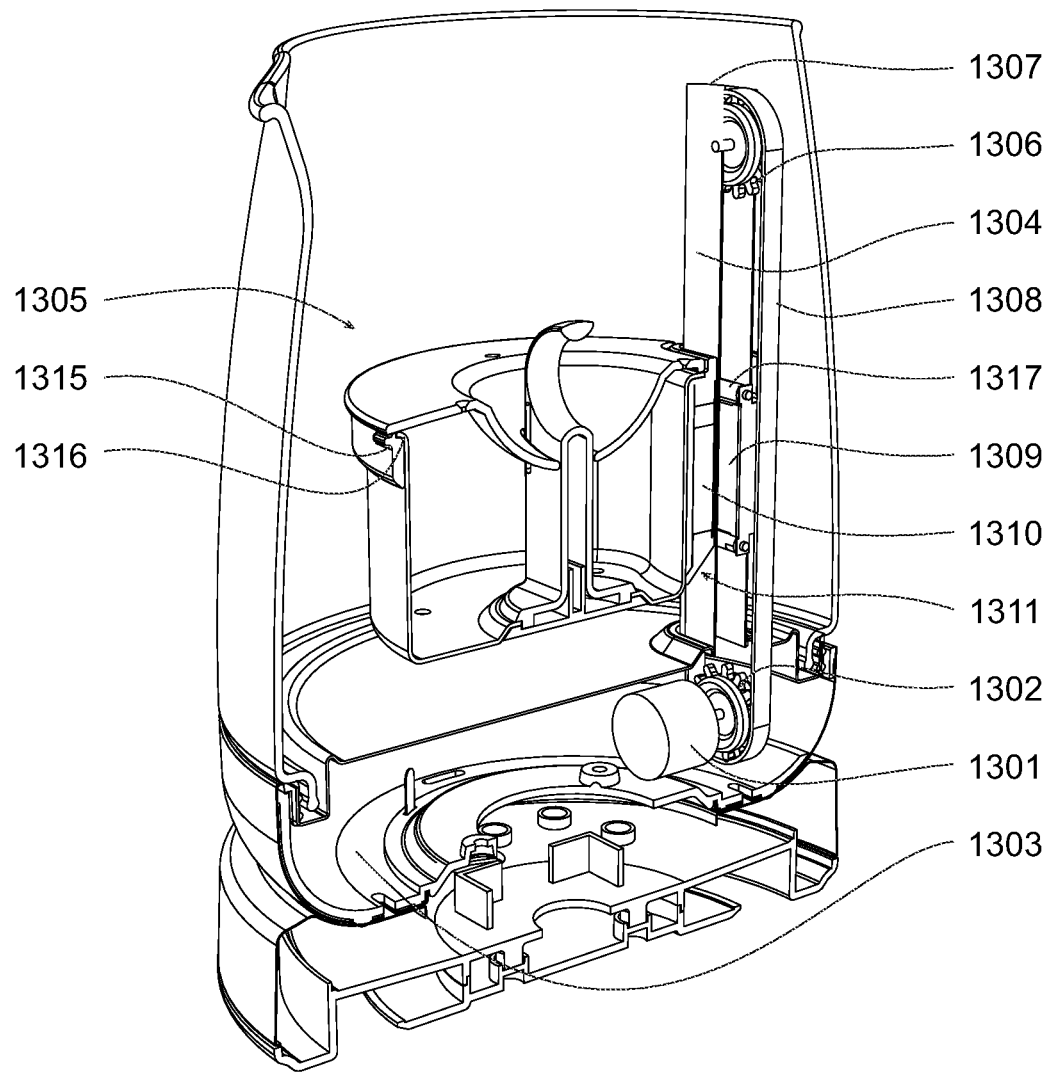
FIG. 13 is a cross section of another embodiment of the tea maker, wherein the vertical conveyor system comprises a belt.
Figure 14:
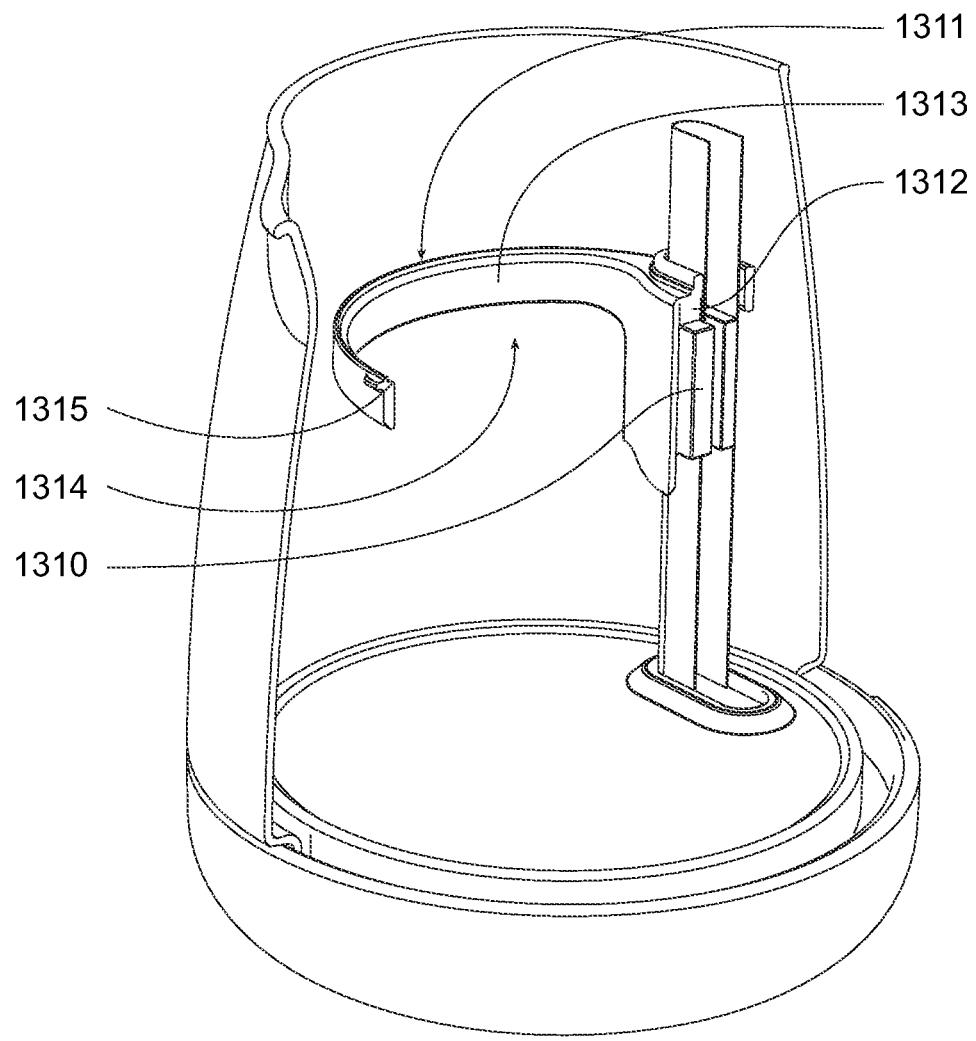
FIG. 14 is a cross section of a retainer.
Figure 15:
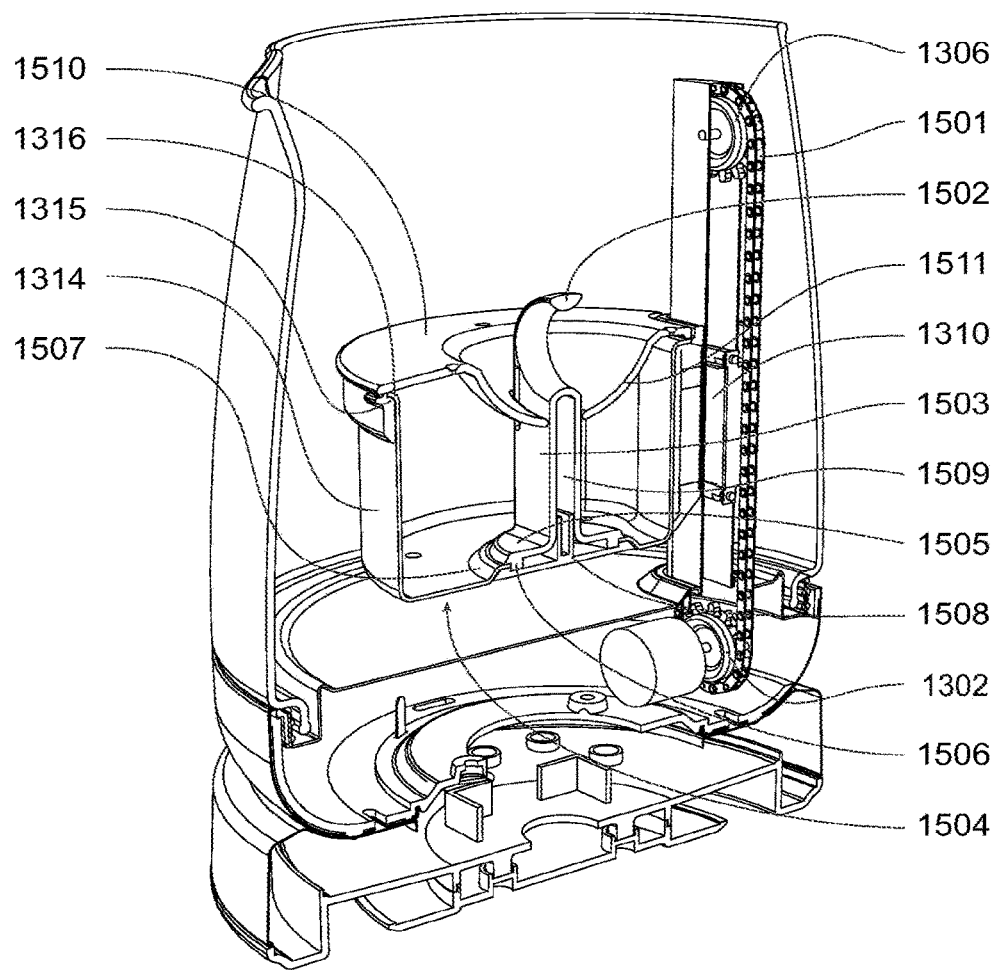
FIG. 15 is a cross section of a further embodiment of the tea maker, wherein the vertical conveyor system comprises a chain loop.

In some embodiments, the vertical conveyor system does not incorporate a vertical shaft. FIGS. 13 to 15 depict two examples. Referring to FIG. 13, the reversible motor 1301 drives a lower gear, sheave or otherwise toothed wheel 1302 that rotates in the vertical plane. Both the motor 1301 and the gear 1302 are located in the lower compartment 1303. The gear 1302 is located directly beneath a sleeve or tube 1304 that extends almost the entire height of the liquid compartment 1305. An upper gear, sheave or otherwise toothed wheel 1306 rotates in the vertical plane and is located within the tube or sleeve 1304, near the top 1307 of the tube or sleeve 1304. The top 1307 may be closed and sealed. A belt 1308 rides around both the top and bottom gears 1302, 1306. Preferably, the belt 1308 has interior teeth that cooperate with the gears 1302, 1306. Therefore a rotation of the motor 1301 causes a vertical travel of the belt 1308 within the sleeve 1304.

A drive magnet (or tube magnet) 1309 is attached to the belt 1308, for example, via a bracket 1317. The drive magnet 1309 travels with the belt 1308. A retainer or driven magnet 1310 located outside the tube 1304 and within the liquid compartment 1305 is coupled to the sleeve magnet 1309 through the tube 1304. The driven magnet 1310 is carried by a retainer 1311. As shown in FIG. 14, the retainer 1311 comprises a vertical jacket 1312 that carries the retainer magnet 1311. The jacket and the magnet may further be provided around or on either side of the tube 1304. The jacket 1312 is rigidly attached to a retaining collar 1313. In this example, the retaining collar 1313 is a loop that is large enough to accommodate the basket 1314. The collar 1313 has an interior top shoulder 1315 on which a top rim 1316 (see FIGS. 13 and 15) of the basket 1314 can sit. The basket 1314 can thus be carried by the retainer 1311 and travel with the belt 1308 when the reversible motor 1301 rotates. Note that in other embodiments, another retaining mechanism may be provided, and the retainer needs not be a loop as depicted. For example, a tongue and groove combination may be provided to attach the basket to the retainer. In another example, the retainer may be a hook or clasp onto which the basket is attached.

As shown in FIG. 15, in another embodiment, the aforementioned arrangement is provided, with the difference that a chain loop 1501 is used instead of a belt. The chain 1501 cooperates with the teeth of the upper and lower gears 1301, 1306. The chain 1501 transports the sleeve magnet 1309 in the manner described above, and in turn transports the retainer 1311 in the manner described above.

Further referring to FIG. 15, the basket may be fitted with a pull ring that facilitates the removal of the basket 1314 from the retainer 1311. In this embodiment, the pull ring is a hollow structure that comprises a ring 1502 and a stalk 1503 beneath the ring 1502. The ring 1502 and stalk 1503 are preferably integrally formed. The stalk 1503 extends to the floor 1504 of the basket 1314. Mower portion 1505 of the stalk 1503 may be disk shaped. The underside of the base carries a skirt 1506 that can be fitted within a raised flange 1507 centrally located and formed from the basket's floor 1504. A location member 1508 is centrally located below the basket's floor 1504 and extends upwardly through the floor 15. The location member 1508 aids the location of the stalk 1503 try fitting within it. The location member 1508 is received within the hollow 1509 of the stalk 1503 when the stalk is properly fitted above the floor 1503.

It is further preferred that the lid 1510 of the basket comprises a central detent 1511 for accommodating the ring 1502. The central detent 1511 may be hemispherical, and is preferably large enough to provide clearance for at least one diameter (finger sized) of the ring 1502. This central detent or clearance 1511 makes it possible for the ring to be located at least partially below the upper lever of the basket's lid 1510. This reduces the additional vessel height that may be required to accommodate the ring 1502.

Figure 16:
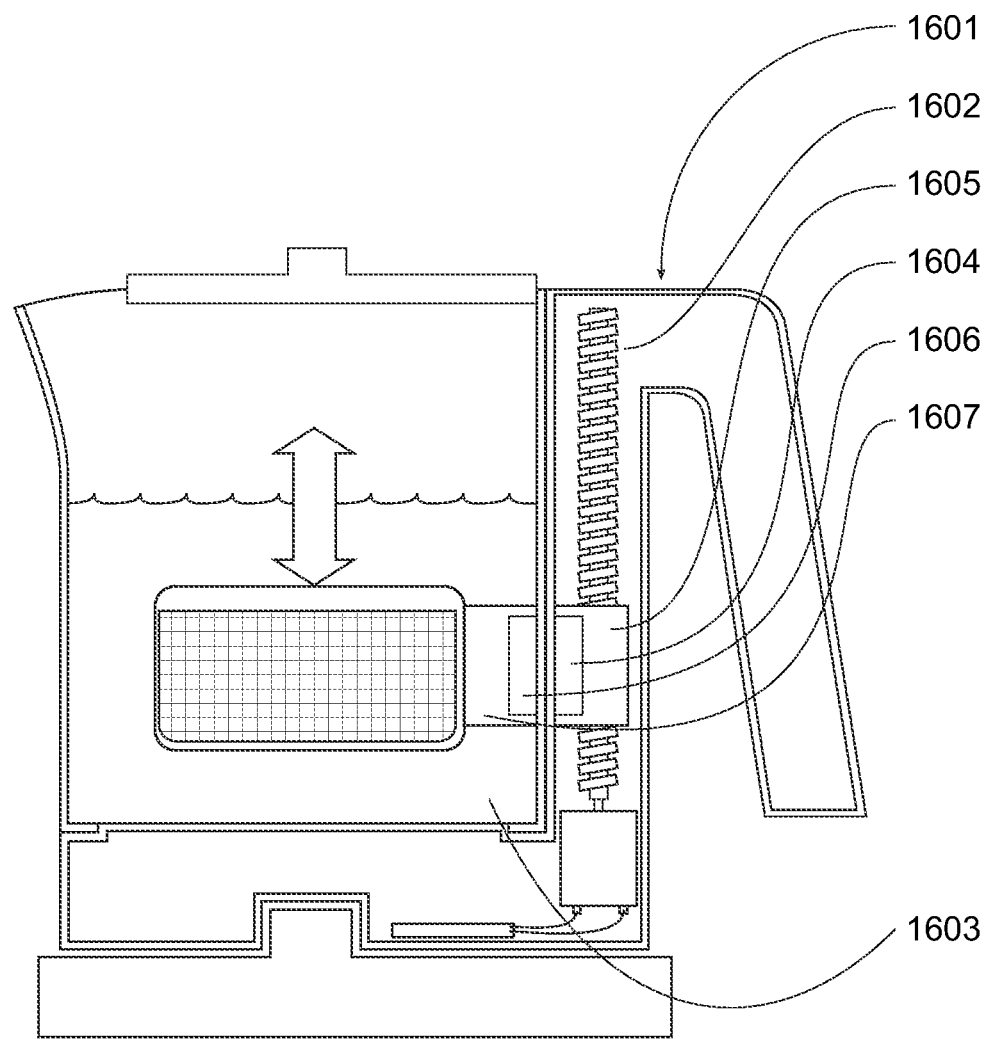
FIG. 16 is a schematic cross section of a further embodiment of the tea maker, wherein the vertical conveyor system is located outside the liquid compartment of the vessel.

In some embodiments, the vertical conveyance system may be provided outside the vessel. Referring to FIG. 16, the handle 1601 additionally has vertical compartment 1602 that is located beside the vessel 1603. The vertical compartment 1602 may be in communication with the vessel's lower compartment. A magnet 1604 is carried by a carriage 1605. The carriage 1605 is transported by a vertical conveyance system located within the vertical compartment. Another magnet 1606 is carried by a second carriage 1607 within the vessel 1603. The magnets 1604, 1606 couple together allowing the vertical conveyor system within the handle's hollow compartment to transport a basket within the vessel 1603.

It should be further noted that the vertical conveyor system can be controlled by devices other than a motor. For example, the driving magnet may be moved by a hydraulic assembly or a pneumatic assembly.

The Steam Passage System

As shown in FIG. 2, an optional steam passageway 201 is located within the open topped tube 205. A steam passageway is required in embodiments where steam detection occurs in the lower compartment. The passageway thus leads from the liquid compartment 203 to the lower compartment 204. The steam travels down the tube 205, enters the steam passageway 201, and arrives in the lower compartment 204. A steam or temperature sensing element 209 detects when steam exits the passage way 201. The steam passageway may be used to contain the conveyor.

Switching Mechanism

So that the vessel can be cordless, a power base supplies power to the vessel's heating elements only when the vessel is on the power base. In preferred examples, the electrical switching of the heating elements is prevented, until the vessel is located onto the power base. This prevents arcing between the electrical contacts of the vessel and the power base. Although the electrical switching components are preferably located in the power base, the externally mounted user interface to those switching components may be mechanical or electrical.

Figure 3:
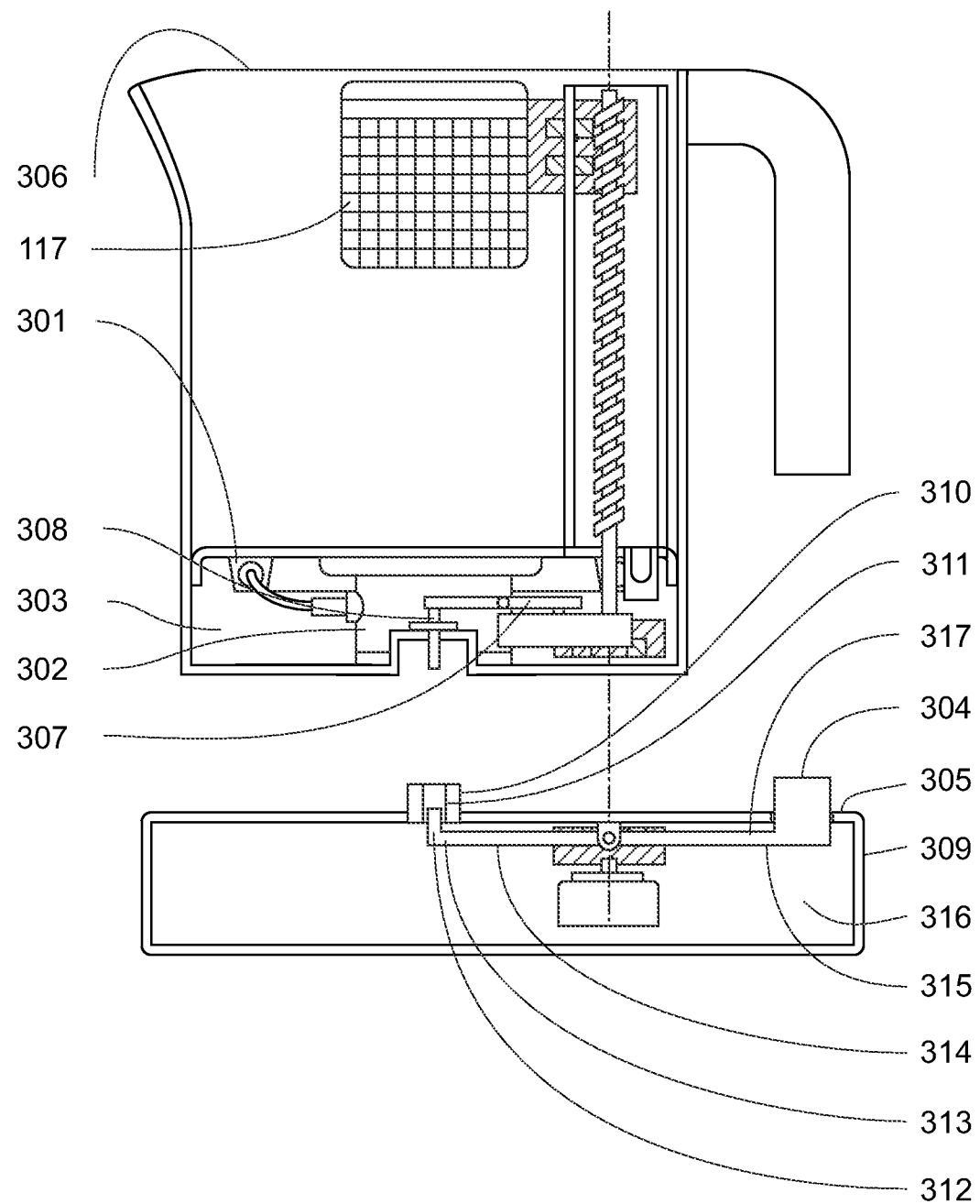
FIG. 3 is a cross section of a tea maker with a switch mechanism, with the vessel and the power base detached from each other.

As shown in FIG. 3, the heating element 301 in the lower portion 303 is controlled by a switching controller 302 also located in the lower portion 303. The switching controller 302 is activated by a mechanical linkage within the power base, and is remotely operable for example by a push button 304 located on a top surface 305 of the power base 309.

The switching controller 302 is activated by a reset power-on lever 307 in the lower compartment or vessel portion 303. The reset power-on lever 307 extends from an off-centre location 303 to a location above an actuator pin 308, shown in this example as near the centre of the lower portion 303. The actuator pin 308 is received by a cooperating tunnel 311 in the raised hub 310.

The actuator pin 308 is in vertical alignment with a stub pin 312. The stub pin 312 forms a first end 313 of a remote switch lever 314. The remote switch lever 314 lies adjacent to the top surface 305 of the power base. The second end 315 of the remote switch lever 314 is beneath the button 304.

Figure 4:
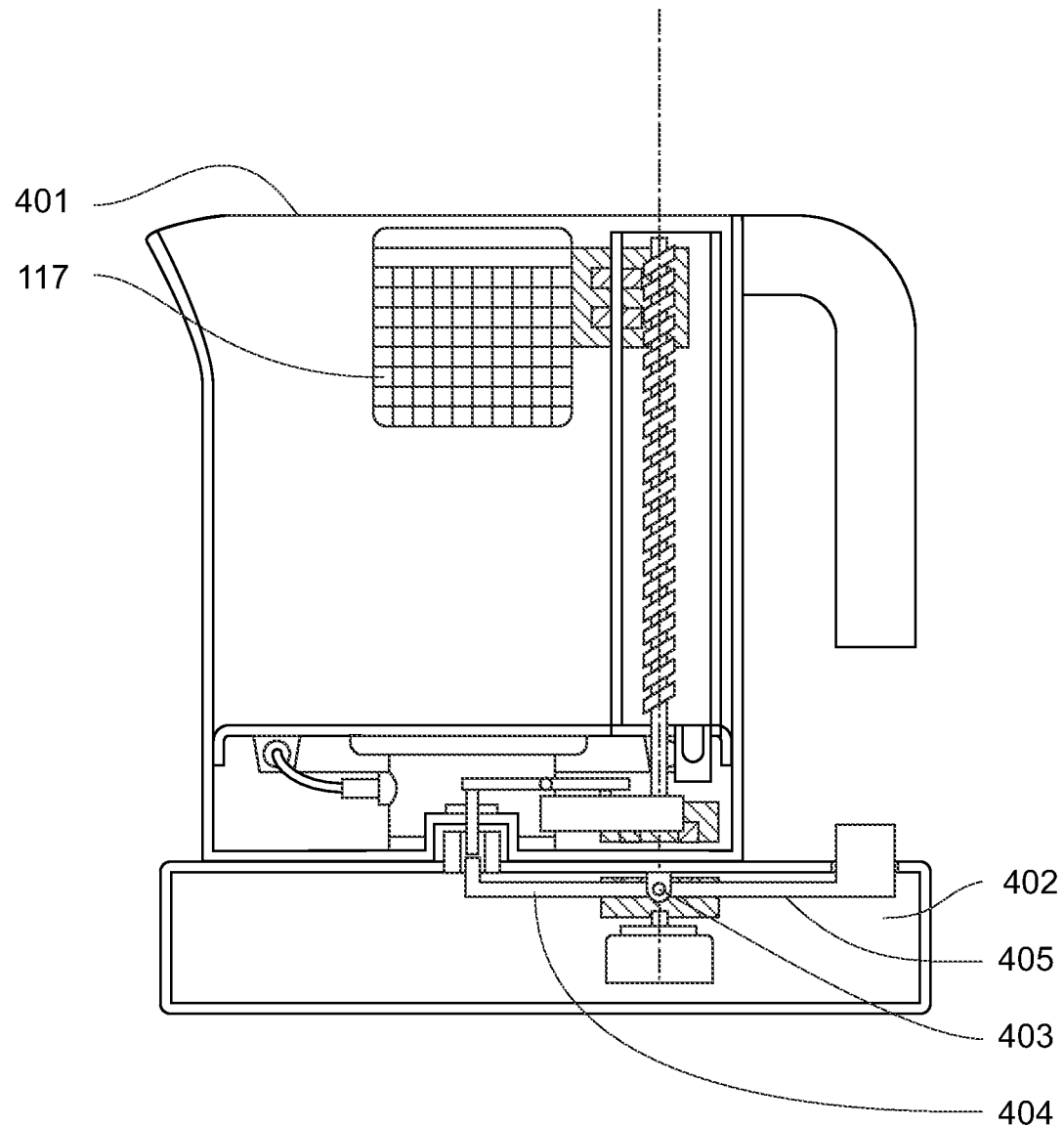
FIG. 4 is a cross section of the tea maker depicted in FIG. 3, with the vessel and the power base attached to each other.

FIG. 4 shows the arrangement described in the previous paragraph when the vessel 401 and the power base 402 are assembled. Note that there is a pivot 403 which goes through an intermediate portion 404 of the remote switch lever 405.

Figure 5:
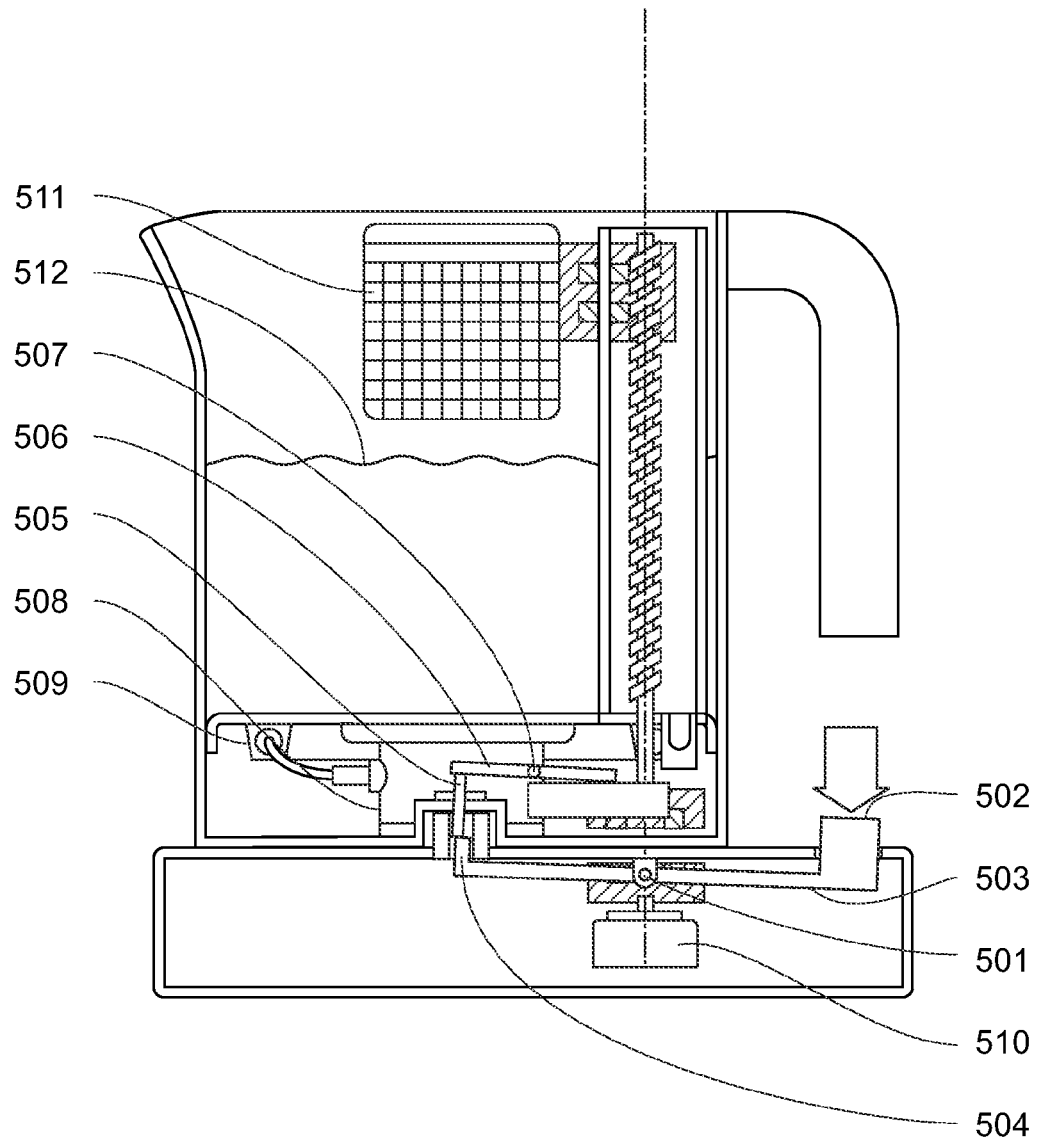
FIG. 5 is a cross section of the tea maker depicted in FIG. 4, but with the switch activated.

Referring to FIG. 5, as the button 502 is pushed down, it causes the remote switch lever 503 to move about the pivot 501. This causes an upward vertical movement of the stub pin 504, leading to another upward vertical movement of the lever actuator pin 505. As the lever actuator pin 505 is pushed upwardly, the reset power-on lever 5*o*6 pivots about a shaft 507 and activates the switching controller 508 for the heating element 509. This chain of action may additionally trigger the motor 510 to turn and cause the basket 511 to be moved.

Figure 8:
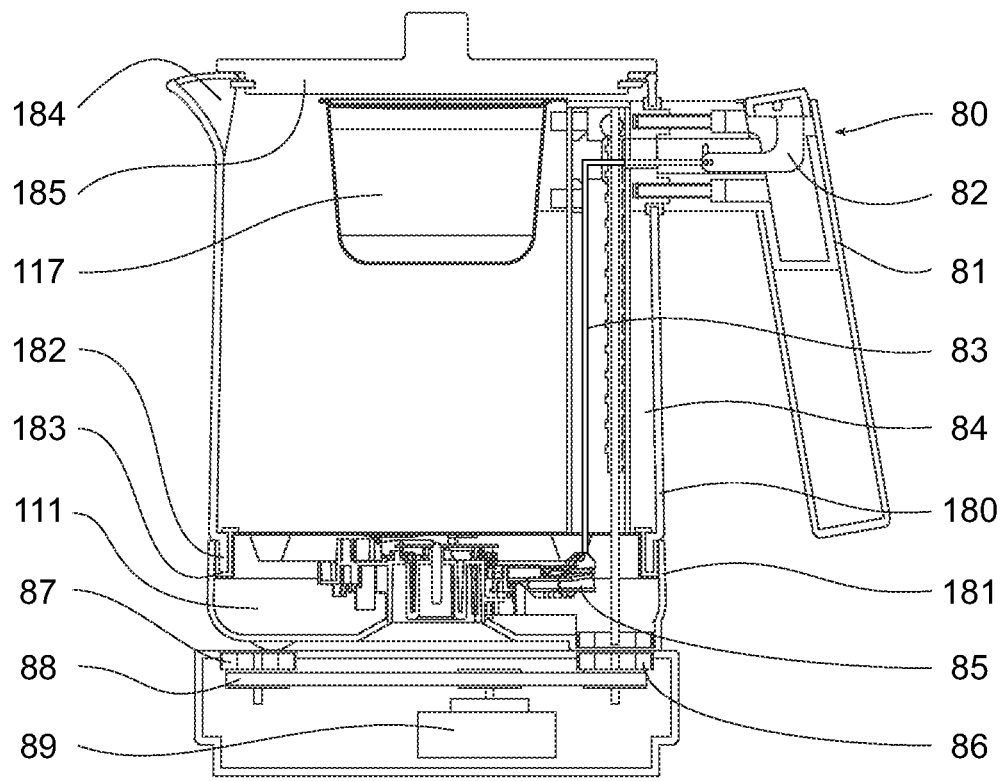
FIG. 8 is a cross section of another embodiment where a mechanical button on the vessel's handle mechanically couples to a switch in the lower vessel portion.
Figure 9:
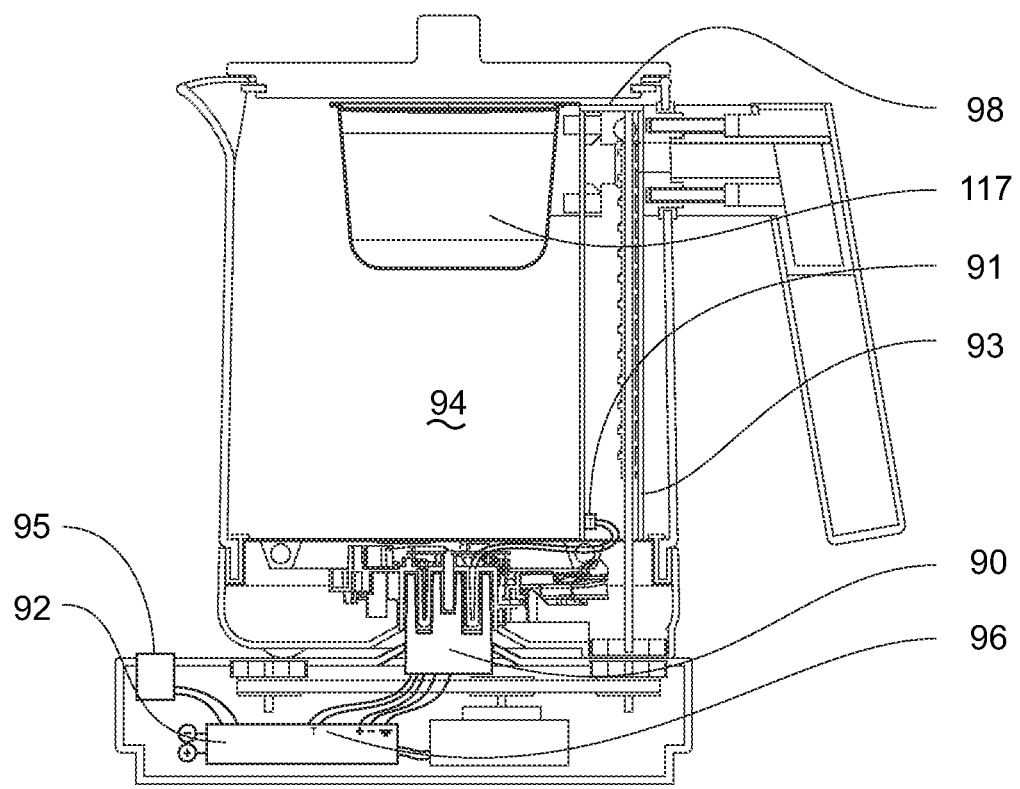
FIG. 9 is a cross section of another embodiment with fully electronic switching and control.

FIG. 8 illustrates an embodiment where a mechanical on-off switch 80 is located in the vessel's handle 81. A mechanical linkage 82 links the switch 80 to a push rod 83 down through the steam tube 84 to activate the control 85 located in the lower compartment in. This embodiment also shows that the kettle can be located on the power base in two positions. Two magnetic couplings 86, 87 in the base are driven by a single belt 88 from a drive cog on the motor 89. FIGS. 8 and 9 also illustrate the joining of a glass liquid compartment 180 to a metal lower compartment 181. The glass compartment is open at each end and has a neck 187 of reduced diameter that is heated within a groove 183 formed by the metal lower compartment. The glass compartment 180 also features the spout 184 and optionally, features for receiving the handle. The lid 185 may be transparent.

Fully electronic control is also provided in some preferred embodiments. As shown in FIG. 9, a power base may have a hub 90 with three or more electrical contacts. In this embodiment, 5 contacts are used. Three contacts are used for power (active, neutral, earth) and two contacts are used to transmit electrical signals from a thermistor 91 in the vessel to the thermistor lead inputs 96 on the controller 92 located in the power base. The thermistor 91 is shown as being located in the metal tube 93 that contains the vertical conveyor. It may be located fully or partially within the interior 94 of the vessel or adjacent to the interior 94. A thermistor 91 as shown can sense the water temperature within the interior of the vessel and provide information to the controller. Note the user activated electronic controls 95 on the upper surface of the power base.

360° Embodiments

The magnetically coupled conveyor system described above requires that the vessel and the power base be assembled in a certain orientation so that the corresponding rotating disks (121, 124) align. There are other embodiments which utilize a similar conveyor mechanism, but do not require the vessel and power base to rotationally align.

Figure 6:
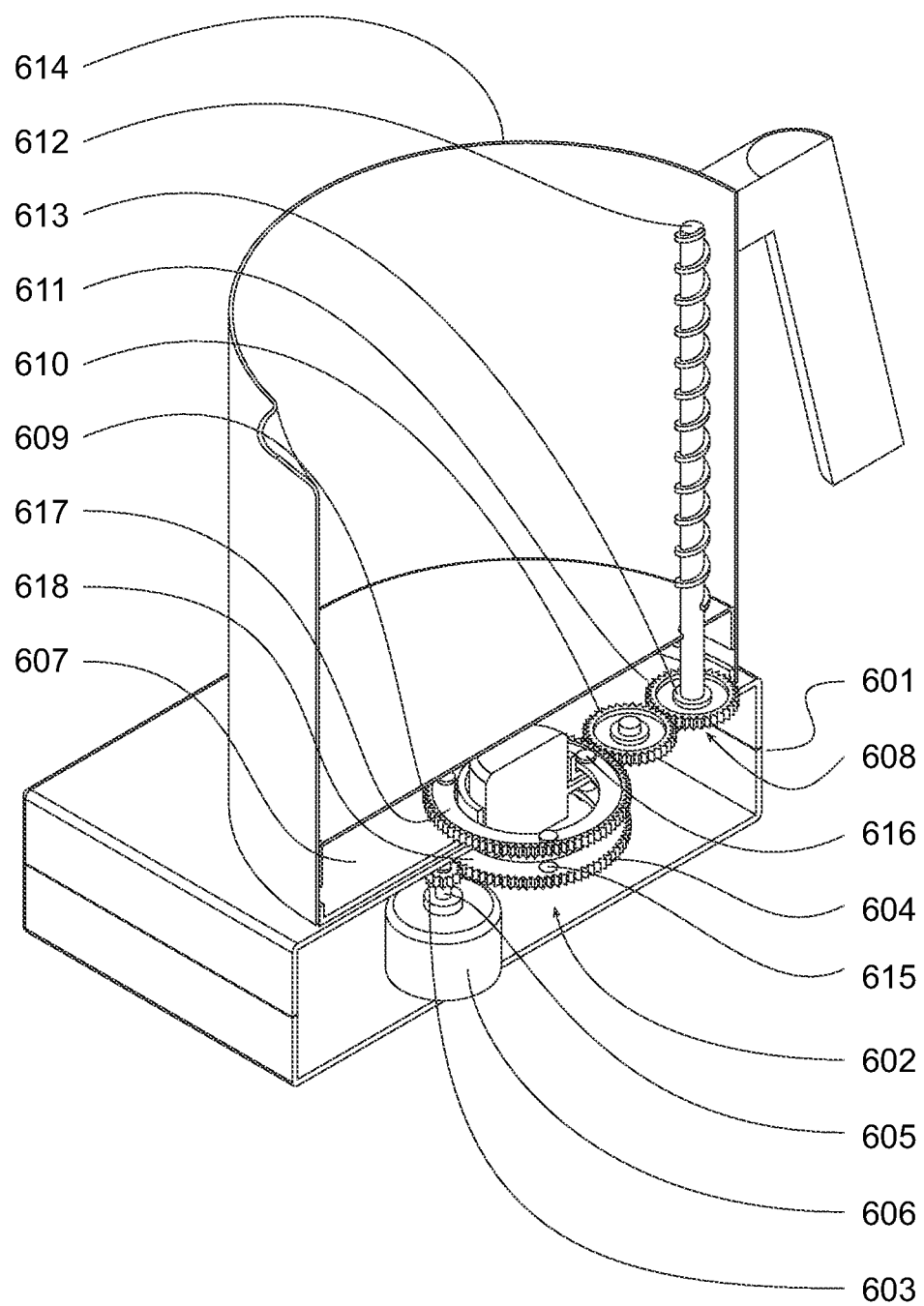
FIG. 6 is a perspective view, cross sectioned to show an embodiment which can be operated in a variety of orientations.

Referring to FIG. 6, the power base 601 comprises a motor 606 in an off-centre location. The motor's pinion gear 603 engages a base ring gear 604. The motor's pinion 603 drives the base ring gear 604.

Correspondingly, the lower vessel portion 607 houses a vessel gear train 608. The vessel gear train 608 starts with a centrally located vessel ring gear 609 which is directly above the base ring gear 604. Mutually attracting magnets 615, 616 spaced around the base and vessel ring gear perimeters 617, 618 couple these two gears together. The vessel ring gear drives a transmission gear 610 that is interlocked with a lift screw gear 611. The screw 612 is attached to the centre 613 of the lift screw gear 611, and turns as the lift screw gear 611 turns.

Figure 7:
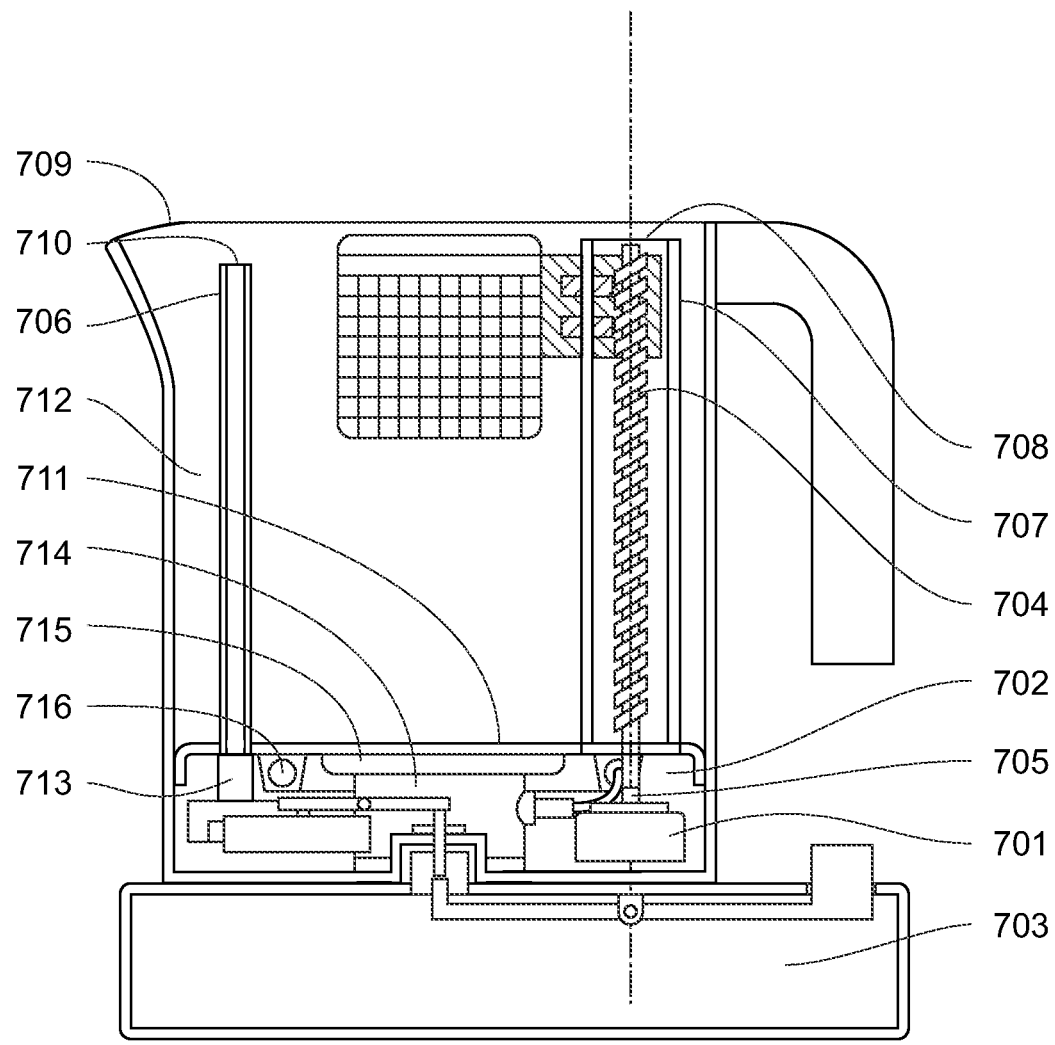
FIG. 7 is a cross section of another embodiment where the reversible motor is in the lower vessel portion.

FIG. 7 shows a further embodiment where the switch mechanism is retained but the reversible motor and optional gearbox 701 is located within the lower portion 702. In embodiments of this type, there is no aforementioned magnetic coupling between the vessel 709 and the power base 703. In this embodiment, the conveyor shaft 704 is directly mounted onto for example a motor shaft 705 of the reversible motor 701 and gearbox.

The example shown in FIG. 7 further includes a separate open ended steam duct 706 that is independent from the tube 707. Thus the interior of the tube 707 can be protected by a closed top 708. Escaping steam 706 travels along the steam duct 706, through the partition 711 between the liquid compartment 712 and the lower compartment 702, and may be directed to a steam or temperature sensor 713, which cooperates with a heating element controller 714.

The heating element controller 714 may, for example, be an integrated unit with an optional variable temperature sensor 715. This temperature sensor may for example be a bi-metal overload or boil dry sensor. Controllers of this kind are available from manufacturers such as OTTER (OTTER A14) and STRIX (STRIX U19). The heating element controller 714 may sense temperatures below the liquid's boiling point, and may be programmed to shut off a heating element 716 so that users may brew beverages at sub-boiling temperatures. The OTTER and STRIX controllers both provide an optional mechanical user interface that protrudes from the side of the lower vessel portion for user adjustment of temperature.

Electronically Controlled Embodiment

FIG. 9 shows a further embodiment where the temperature of the water is monitored electronically by a thermistor. The thermistor may be located just below the heating plate, or immersed in the water. In embodiments of this type a steam tube is not required.

In the embodiment suggested by FIG. 9, the tube for the vertical conveyor 93 can have a closed top 98. The base is fitted with a display and an interface 95 so the user can select water temperature and brew ("steeping") time for the tea type being used. The processor in the base calculates, from the user inputs, the recommended temperature and steeping time for the selected tea. The recommended temperature (i.e. water temperature for brewing), depends on the type of tea brewed, and may be boiling or sub-boiling. The processor then controls the vertical conveyor and the heating element accordingly.

Tea Making

Figure 11:
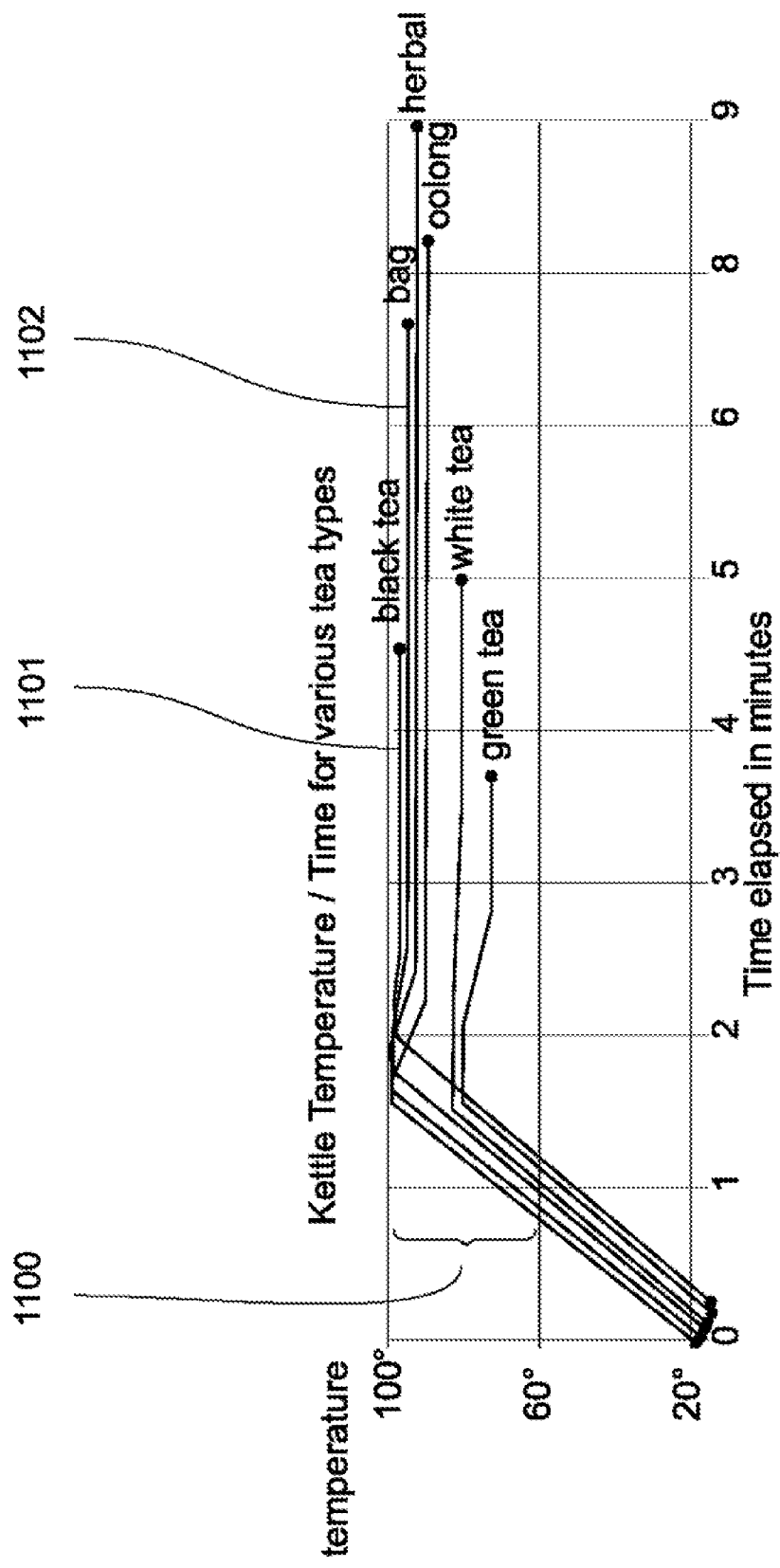
FIG. 11 is a graph illustrating time v. temperature curves for various tea types.

As shown in FIG. 11 automatic tea makers of the kinds disclosed above may be used to brew different types of teas, each according to an optimised temperature and time profile. As shown in that figure, teas are brewed within a temperature range of about 70-95 C. Activation of an electronic or mechanical user operated button causes power to be delivered to the vessel's heating elements. The water temperature within the vessel will rise to the correct brew temperature before the basket descends into the water. Bi-metallic or thermistor heat sensors (as previously described) communicate with the processor 135 to ensure that each tea is maintained at the appropriate brew temperature 1101, 1102 etc for the appropriate time. As suggested by FIG. 11, black teas are brewed for approximately 2.5 minutes whereas a teabag may brew for over 5.5 minutes. As shown in this graph, green and white teas brew at a lower temperature than the other teas and in the case of e.g. green teas, for a shorter period of time.

Figure 12:
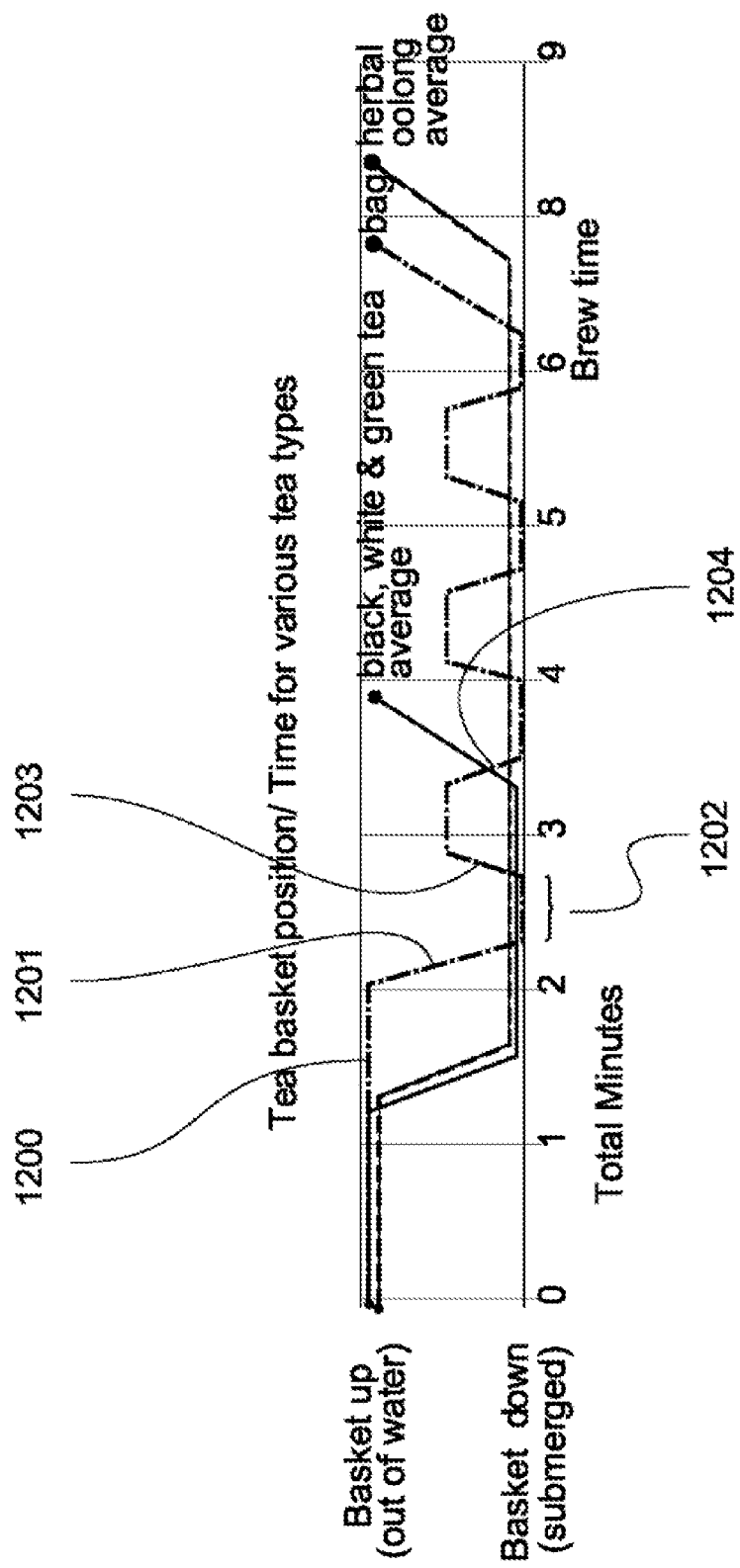
FIG. 12 is a graph illustrating tea basket position over time for various tea types

As shown in FIG. 12, the processor can control the movement of the basket at the beginning of a brew cycle by controlling the vertical conveyor so as to lower the tea basket into the hot water. The processor can also control the movement of the tea basket by causing the vertical conveyor to lift the basket out of the hot water at the end of the brew cycle. As suggested by FIG. 12, the controller can also oscillate or reciprocate the tea basket during the brew cycle so as to agitate the tea leaves and cause better circulation within the tea basket. As suggested by FIG. 12, tea that is already contained in bags remains in the basket but out of the water about two minutes 1200 while the water is heating. It is then lowered 1201 by the screw conveyor into the hot water whereupon it remains submerged and static for a period of time 1202. The basket is then partially raised 1203 and subsequently lowered 1204. This cycle of raising and lowering the basket is repeated, in this example, three times. The processor may be pre-programmed to control the movement of the tea basket according to the type of tea leaf contained within it.

While the present invention has been disclosed with reference to particular details of construction, these should be understood as having been provided by way of example and not as limitations to the scope or spirit of the invention.

What is claimed is:

1. An automated tea maker apparatus comprising a base and a removable vessel having a liquid compartment for holding water, the base providing electrical power to the vessel, the apparatus including:
   a conveyor located within the vessel, the conveyor carries a movable carriage having lift magnets;
   a sleeve that sealingly-separates the conveyor and carriage from the liquid compartment, and extends to a height within the liquid compartment; a motor located beneath the liquid compartment, the motor being coupled to the conveyor for moving the carriage within and along the sleeve; a removable tea basket located in the liquid compartment and carried by the carriage located within the sleeve;
   wherein the basket comprises a retainer element having lift magnets that forms a magnetic coupling to the movable carriage, the magnetic coupling acts through the sleeve to enable the retainer element to be outside the sleeve while coupled to the movable carriage located inside the sleeve, such that movement of the carriage along the sleeve causes respective movement of the basket in the liquid compartment; and
   wherein the carriage is located within the sleeve and separated from the liquid compartment.

2. The apparatus according to claim 1, the apparatus further comprising:

a heating assembly associated with the vessel;
a controller coupled the heating element and the conveyor;
the controller activates the heating assembly to heat the water to a target temperature, the controller activates the motor to lower the tea basket into the heated water once the water is heated to a target temperature; and
a user interface is coupled to the controller, the user interface being adapted to send a command to a processor, the command being indicative of the target temperature of the water;
the controller maintains the tea basket in the water for a predetermined target brew time, the controller then activates the conveyor to raise the tea basket from the water.

3. The apparatus according to claim 2, wherein:
the heating assembly includes a temperature sensor and a heating element, the controller being coupled to the temperature sensor and the heating element, the controller also being used to determine when the water is at the target temperature and to activate the conveyor to lower the basket into the heated water when the target temperature has been achieved in the water.

4. The apparatus according to claim 3, wherein:
the temperature sensor is a thermistor that sends a temperature data to the processor, the controller being able to regulate the heating element to maintain the water at the target temperature.

5. The apparatus according to claim 3, wherein:
the conveyor is a vertical shaft that carries screw threads; and
the sleeve surrounds the vertical shaft in the vessel is adapted to block a rotation of the basket about the vertical shaft.

6. The apparatus according to claim 3, wherein:
the basket, when attached to the carriage and submerged in the liquid compartment, moves up and down under an influence of the conveyor in reciprocating brew enhancing strokes.

7. The apparatus according to claim 6, wherein:
an amplitude of the brew enhancing strokes is smaller than a full range of the basket's vertical motion.

8. The apparatus according to claim 1, wherein:
the liquid compartment has a lid, and a height of the liquid compartment is sufficient to accommodate the basket beneath the lid when the lid is closed and above a level of liquid within the liquid compartment.

9. The apparatus according to claim 1, the apparatus further comprising:
a heating assembly associated with the vessel;
a controller coupled the heating element and the conveyor; the controller activates the heating assembly to heat the water to a target temperature, the controller activates the motor to lower the tea basket into the heated water once the water is heated to a target temperature; and a user interface is coupled to the controller, the user interface being adapted to send a command to the controller, the command being indicative of the target temperature and a target brew time;
wherein the controller first activates the heating assembly to preheat the water to the target temperature, the controller then activates the conveyor to lower the tea basket into the preheated water after the water temperature reaches the target temperature; the controller maintains the tea basket in the water for the target brew time, and the controller is then activates the conveyor to raise the tea basket from the water; and
wherein the user interface comprises an input device that enables a user to select a tea type; such that user selection of a tea type causes the user interface to send a command to a controller, the command being indicative of the target water temperature and the target brew time associated with the user selected tea type.

10. The apparatus according to claim 9, wherein:
the heating assembly includes a temperature sensor and a heating element, the controller coupled to the temperature sensor and the heating element, the controller also being used to determine when the water is at the target temperature and to activate the conveyor to lower the basket into the preheated water when that target temperature has been achieved in the water; and the temperature sensor is a thermistor that sends a data to the processor, the controller being able to regulate the heating element to provide target water temperature.

11. The apparatus according to claim 9, wherein:
the conveyor includes a vertical shaft that carries screw threads; and
the sleeve surrounds the vertical shaft in the vessel is adapted to block a rotation of the basket about the vertical shaft.

12. The apparatus according to claim 9, wherein:
the user selection of the tea type causes the user interface to send a command to the controller, the command being indicative of the target water temperature being in the range of range of about 70 to 95 degrees Celsius.

13. The apparatus according to claim 1, wherein the conveyor includes a vertical shaft; the shaft carries a screw thread that engage the carriage and drives movement of the carriage within the vessel sleeve.

14. The apparatus according to claim 13, wherein the sleeve surrounds the vertical shaft in the vessel, and is adapted to block a rotation of the carriage about the vertical shaft.

15. The apparatus according to claim 13, wherein the sleeve surrounds the vertical shaft in the vessel, and is adapted to restrict a rotation of the basket about the vertical shaft.

16. The apparatus according to claim 13, wherein the carriage or retainer includes a one or more lift magnets.

17. The apparatus according to claim 13, wherein the liquid compartment has a lid, and a height of the liquid compartment is sufficient to accommodate the basket beneath the lid when the lid is closed and above a level of liquid within the liquid compartment; the height of the liquid compartment is sufficient to accommodate submersion of the basket during a tea brewing cycle.

18. The apparatus according to claim 1, wherein the conveyor drives the carriage both upward and downward within the vessel.

19. The apparatus according to claim 18, wherein the carriage or retainer includes a one or more lift magnets.

20. The apparatus according to claim 18, wherein the carriage is sealed from the liquid compartment.

21. The apparatus according to claim 1, wherein the conveyor is belt conveyor that carries the carriage; the motor drives movement of the belt conveyor which moves the carriage within the sleeve.

* * * * *